US007143682B2

(12) United States Patent
Nissing et al.

(10) Patent No.: US 7,143,682 B2
(45) Date of Patent: Dec. 5, 2006

(54) LARGE MANIPULATOR HAVING A VIBRATION DAMPING CAPACITY

(75) Inventors: Dirk Nissing, Neukirchen-Vluyn (DE); Werner Bernzen, Ehningen (DE); Karl-Heinz Koop, Haltern (DE)

(73) Assignee: Schwing GmbH, Herne (DE)

( * ) Notice: Subject to any disclaimer, the term of this patent is extended or adjusted under 35 U.S.C. 154(b) by 469 days.

(21) Appl. No.: 10/466,035

(22) PCT Filed: Jan. 9, 2002

(86) PCT No.: PCT/EP02/00147

§ 371 (c)(1),
(2), (4) Date: Nov. 6, 2003

(87) PCT Pub. No.: WO02/055813

PCT Pub. Date: Jul. 18, 2002

(65) Prior Publication Data

US 2004/0076502 A1 Apr. 22, 2004

(30) Foreign Application Priority Data

Jan. 15, 2001 (DE) ................................ 101 01 570

(51) Int. Cl.
*F15B 13/16* (2006.01)
*B62D 5/06* (2006.01)

(52) U.S. Cl. ........................ 91/358 R; 91/361; 91/392; 92/5 R

(58) Field of Classification Search ...................... 91/1, 91/358 R, 361, 392, 511, 508, 517, 518, 519, 91/459; 92/5 R, 143
See application file for complete search history.

(56) References Cited

U.S. PATENT DOCUMENTS

| | | | | |
|---|---|---|---|---|
| 3,685,543 | A * | 8/1972 | Schwing et al. | 137/615 |
| 4,896,582 | A * | 1/1990 | Tordenmalm et al. | 91/361 |
| 5,640,996 | A * | 6/1997 | Schlecht et al. | 91/361 |
| 5,823,218 | A * | 10/1998 | Schlecht et al. | 91/363 R |

FOREIGN PATENT DOCUMENTS

| | | |
|---|---|---|
| DE | 10060077 A1 * | 6/2002 |
| JP | 5230999 | 9/1993 |
| JP | 7217212 | 8/1995 |
| JP | 9265324 | 10/1997 |

(Continued)

OTHER PUBLICATIONS

International Search Report for PCT/EP02/00147.

*Primary Examiner*—Igor Kershteyn
(74) *Attorney, Agent, or Firm*—Sheridan Ross P.C.

(57) ABSTRACT

A large-size manipulator comprises a boom made up of several segments and arranged on a vehicle frame. The boom is foldable and has a slewing track ring rotated about a vertical axis of rotation. The boom segments can be swiveled with respect to each other and with respect to the slewing track ring. A distant steering system includes a steering organ to operate the driving units and to set a desired position of the driving units and/or the boom segments and the slewing track ring. A control system includes a monitoring unit to ascertain a parameter that describes a disturbance condition of at least one boom segment. A determination unit determines the load that acts on a driving unit in opposition to the position set by the steering organ. The control system assures that the driving unit is controlled to minimize the deviation from the set position of the boom segments. Vibration of the boom segments will therefore be damped.

19 Claims, 3 Drawing Sheets

FOREIGN PATENT DOCUMENTS

| | | |
|---|---|---|
| JP | 2000192660 | 7/2000 |
| WO | WO 02/25036 | 3/2002 |
| WO | WO 02/055813 | 7/2002 |

* cited by examiner

LARGE MANIPULATOR HAVING A VIBRATION DAMPING CAPACITY

FIELD OF THE INVENTION

The present invention relates to a large-size manipulator in accordance with the preamble of Claim 1 and/or a truck-mounted concrete pump with such a large-size manipulator, as well as a method of operating such a large-size manipulator.

BACKGROUND OF THE INVENTION

Large-size manipulators find application, for example, with truck-mounted concrete pumps in which concrete is pumped by means of a concrete pump through a concrete-conveyance conduit that is carried on a multi-segment distribution boom, so that the concrete can be conveyed accurately and over a substantial distance to a particular target point. Conventionally the distribution boom consists of one or more segments and by means of appropriate hydraulic cylinders with deflection linkages can be folded at its articulated joints. The boom may be mounted either on a mobile undercarriage, generally a truck chassis, or a stationary platform and can be swivelled around a vertical axis.

In the case of conventional concrete pumps an operator steers the hose end of the conduit by means of a distant steering system towards the position where the concrete is to placed (rough positioning). This is done by means of direct operation of the valves associated with the individual cylinders of a hydraulic system. Another operator leads the terminal hose across the actual placing site (fine positioning). Depending on the particular design, elastic deformations will come into being in the segments of the distribution boom, so that the boom tends to set up vibrations. Particularly in view of the fact that conveyance of concrete by means of twin-cylinder thick-slurry pumps is pulsed rather than continuous, the distribution boom, and especially its last member, is induced to vibrate as the concrete issues from the terminal hose, so that a vibration amplitude of more than a meter may occur at the terminal hose. When the pumping frequency is in the region of the eigenfrequency (natural frequency) of the distribution boom, resonance vibrations may be set up. In conventional concrete pumps with distribution boom the concrete throughput of the pump and therefore the pumping frequency are throttled back sufficiently to keep the vibrations at the boom tip within limits, thereby avoiding danger for the operator guiding the terminal hose.

BRIEF SUMMARY OF THE INVENTION

It is therefore the task of the invention to damp the vibrations of the distribution boom, especially those of its last members and the terminal hose, and to reduce the deflection of the boom tip on the occasion of pump thrusts in such a manner as to minimize the maximum vibration amplitude, preferably limiting it to 10 to 20 cm. Over and above this, it is the task of the present invention to provide a large-size manipulator that obtains this result at a reasonably small cost, especially construction cost, and assures simple, but also safe and effective operation.

This task is solved by the large-size manipulator as set forth in the claims appended hereto to include a truck-mounted concrete pump as claimed as well as the method as claimed.

The idea underlying the invention is that, given a distribution boom of the conventional type, the distant steering system by means of which an operator assures the positioning of the large-size manipulator is supplemented by an automatic control system that has to monitor only two different parameters in order to control the driving units already available for operating the manipulator in such a way as to minimize the vibrations that are caused by some disturbance condition, discontinuous pump thrusts—for example—in the case of concrete pumps, and reduce the amplitude of the deflections, that is to say, the distance by which the large-size manipulator deviates from its desired position. In this way one obtains that only a few data have to be monitored (recorded), which leads to a simplification of the regulation system and, further, that no additional components are needed for operating the large-size manipulator. i.e. that the vibrations caused by the disturbed condition can be counteracted with the already available driving units.

To this end the control system monitors a parameter that describes the disturbance condition that leads to the deviation from the predefined position and, more particularly, causes the vibrations, this for at least one segment of the boom. In the case of concrete distribution booms, for example, this could be the determination of the pressure fluctuations in the concrete-conveyance conduit.

Furthermore, the system determines the load sustained by at least one of the driving units that serve to displace the boom segments. By means of these data, namely the monitored disturbance variable and the load sustained by the driving unit, at least one of the driving units is regulated by the control system in such a manner that operation of the driving unit in question will minimize the deviation from the desired position and damp the vibration of the boom segment/s. To this end the control system is provided with at least one monitoring unit for monitoring the parameter that describes the disturbance condition and at least one determination unit for determining the load that is being sustained by the driving unit.

Preferably the control system will comprise a means for minimizing the damping that uses the determined load as the input variable and as output variable produces a control parameter for the driving unit. For example, in the case of a concrete distribution boom in which the driving units for the boom segments are constituted by hydraulic cylinders, the control parameter could be the displacement speed of the cylinder pistons.

Preferably the damping minimization means will be constituted by a virtual spring-damper element that comprises at least one spring element and one damper element connected in parallel. The virtual spring-damper element here represents the driving unit, for example, the hydraulic cylinder in the case of a concrete distribution boom. The control concept based on the virtual spring-damper element is underlain by the idea that an effective damping will be obtained if the driving unit, the hydraulic cylinder for example, behaves like a parallel-connected spring-damper element. An appropriate control parameter for the driving unit can then be calculated from the equilibrium of the force component that acts on the driving unit and the force component of the spring-damper element. Apart from the advantage that this concept only calls for a slight enlargement of the overall structure of the manipulator due to the application of a few sensors, a further advantage is represented by the stability of the overall control concept of the damping minimization means. Subject to the assumption that the control system functions properly and that the driving unit behaves like a spring-damper element, the boom will behave in a stable manner, because the only thing to be dissipated is the energy that acts on it due to the disturbance condition. The stiffness of the spring element and the damping constant of the damping element may be freely chosen. But there does exist a configuration in which the vibration propensity of the manipulator becomes minimized, namely when the guidance behaviour of the driving unit is as rapid as possible. This optimal parameter configuration, in its turn, depends on the boom position and the size of the boom.

Furthermore, the control system will advantageously comprise a disturbance variable superimposition device that uses the parameter describing the disturbance detected by the monitoring unit as input variable and then calculates from it a setting of the driving unit that is corrected with respect to that setting employed by the operator and compensates the disturbance.

In the preferred case in which the determination unit determines the disturbance condition from the parameter ahead of time, i.e. before the disturbance condition occurs in the position where a compensation by means of the control system is to be obtained, sufficient time will be available to provide a setting of the driving unit that will counteract the disturbance. For example, if in the case of a concrete distribution boom it is known due to the determination unit that a pressure wave is being propagated though the concrete-conveyance conduit, it will be possible for the disturbance variable superimposition device to impose a corrected setting of the driving unit and thus to bring a given segment of the boom into a position opposing the pressure wave. It is therefore advantageous if the determination unit is provided with sensors that measure the parameter characterizing the disturbance condition in positions that, as seen from the boom tip, are situated before the segment that is to be corrected. For example, if the deflection at the boom tip is to be compensated, it will be advantageous to provide the pressure sensors already at the foot of the distribution boom for a concrete pump, though this implies finding a compromise between the exactness of the monitoring of the disturbance in the position that is to be compensated and the possibility of having sufficient time to react thereto. Alternatively, the disturbance variable can be measured also directly at the point where it comes into being, for example, when the concrete pump is switched, the measurement can be performed at the pump and combined with a measurement of the flow speed in the concrete-conveyance conduit.

It is particularly advantageous for the disturbance variable superimposition device and the damping minimization means to be combined in the control system in such a manner that the corrected setting (position) of the driving unit determined by the disturbance variable superimposition device on the basis of the estimated disturbance will have the setting selected by the operator superposed on it before it is used as the desired setting for the purposes of the calculation in the damping minimization means. This will not only assure that the vibrations are reduced by the damping minimization means, for example, as regards the number of the vibrations and also the amplitude of the vibrations by, for example, avoiding resonance vibrations, but will also oppose a direct deflection of the desired position due to the disturbance variable, where the inclusion of the corrected setting in the calculation of the damping minimization means avoids also additional vibrations due to unnecessary movements of the driving unit.

When the determination of the disturbance variable and or the damping by the damping minimization means are determined in advance, as is preferred, it will also be advantageous if in the case of the large-size manipulator the control is not necessarily referred to the driving unit that is directly responsible for the operation of the boom segment in which the vibrations and amplitudes are to be kept as small as possible, the boom tip for example, but rather some other segment that, as seen from the boom tip, is situated before the boom segment that is to be corrected.

The realization of the control system calls [for the use of] various sensors and measuring systems that to some extent depend on the choice of the appropriate driving units and the purpose for which the large-size manipulator is to be used. In the case of a large-size manipulator in the form of a concrete distribution boom with articulated joints that are operated by means of hydraulic cylinders, it will be advantageous if the displacement speed of the cylinder piston is regulated as the control parameter.

According to an advantageous embodiment in which a virtual spring-damper element is used as the damping minimization means, the displacement speed of the driving unit has to be determined as the control parameter. This follows from the Newtonian axiom:

$$\sum_n F_n = 0 \qquad \text{Equation 1}$$

When the driving unit behaves as a spring-damper element, we therefore have $$F_r(t)+d*\dot{s}(t)+c*s(t)=0 \qquad \text{Equation 2}$$

where $F_r(t)$ is the force, expressed as a function of time, that acts on the driving unit as a result of the disturbance, d is the damping constant, s(t) is the displacement speed, as a function of time, c is the spring constant and s(t) the position of the driving unit as a function of time. Rearranging this equation, it can be solved for the displacement speed s(t), i.e.

$$\dot{s}(t)=-[F_r(t)+c*s(t)]/d \qquad \text{Equation 3.}$$

If the driving unit is now controlled in such a manner as to set the displacement speed ds/dt that is determined by means of Equation 3, the unit will simulate the characteristics of a spring-damper element. An optimal damping can then be obtain by means of station-specific adjustment of the parameters c and d.

If the displacement speed is to be controlled, it is therefore also necessary for the control system to comprise a speed controller that can control the driving unit by imposing the displacement speed determined by the damping minimization means. Furthermore, it is necessary that the control system should comprise at least one position sensor capable of determining the position (setting) of the driving unit. An appropriate position sensor may also be designed as a path-measuring system, so that, starting from an initial position of the driving unit, it becomes possible to determine its effective position. At the same time, such a path-measuring system can also serve to monitor the displacement speed of the driving unit, in which case the system would have to determine the displacement speed from the change of position of the driving unit. Alternatively, it may be advantageous to provide another speed sensor independent of the path-measuring system to effect direct measurements of the displacement speed of the drive unit.

In the preferred embodiment of a concrete distribution boom in which the driving units for the boom segments are hydraulically or pneumatically operated cylinders, the determination unit will preferably comprise force sensors attached to the piston rod or pressure sensors associated with the cylinder chambers capable of determining the load sustained by the driving unit, respectively, by means of a direct measurement of the force or from the pressure difference in the cylinder chambers.

The monitoring device of this advantageous embodiment further comprises at least one pressure sensor and, preferably, two or more pressure sensors in the concrete conveyance conduit, so that in this manner the pressure fluctuations in the concrete conveyance conduit can be determined as disturbance variable.

Preferably, the speed controller controlling the displacement speed of the driving unit will control the displacement speed of the preferably hydraulically operated cylinder via a valve arranged between the cylinder chambers and a hydraulic oil supply, where both the speed controller and the valve in the hydraulic system have to function with sufficient accuracy and rapidity in order to set the displacement speed determined by the damping minimization means as precisely as possible.

The large-size manipulator described above is particularly suitable for mobile concrete pumps mounted on a vehicle chassis, since with equipment of this kind the disturbances caused by the employed twin-cylinder dense-slurry pumps can be ideally reduced as far as the corresponding large-size manipulator is concerned.

Furthermore, it has been found that the operation of a large-size manipulator of this kind is advantageous inasmuch as the operator can continue to set the desired position of the boom segments and/or the slewing track ring of the large-size manipulator and that any deviation from the desired position will then be automatically compensated without the operator having to adjust the position and that, in particular, vibration will be damped. It is particularly advantageous that when the boom is operated in this manner, the desired position of the boom can be changed by the operator independently of regularly recurring disturbances, pressure shock in the case of concrete pumps being a case in point, and that in this case, once again, the disturbances that occur will be automatically compensated and that it is possible for the large-size manipulator to be accurately aligned with its target.

BRIEF DESCRIPTION OF THE DRAWINGS

Further advantages, features and characteristics of the present invention will be brought out by the detailed description that is about to be given with the help of the drawings appended hereto. The drawings show, all in a purely schematic form, in FIG. 1 the side elevation of a large-size manipulator designed as a concrete distribution boom, firstly in an extended condition and secondly in the folded condition.

DETAILED DESCRIPTION OF THE DRAWINGS

Figure 1:
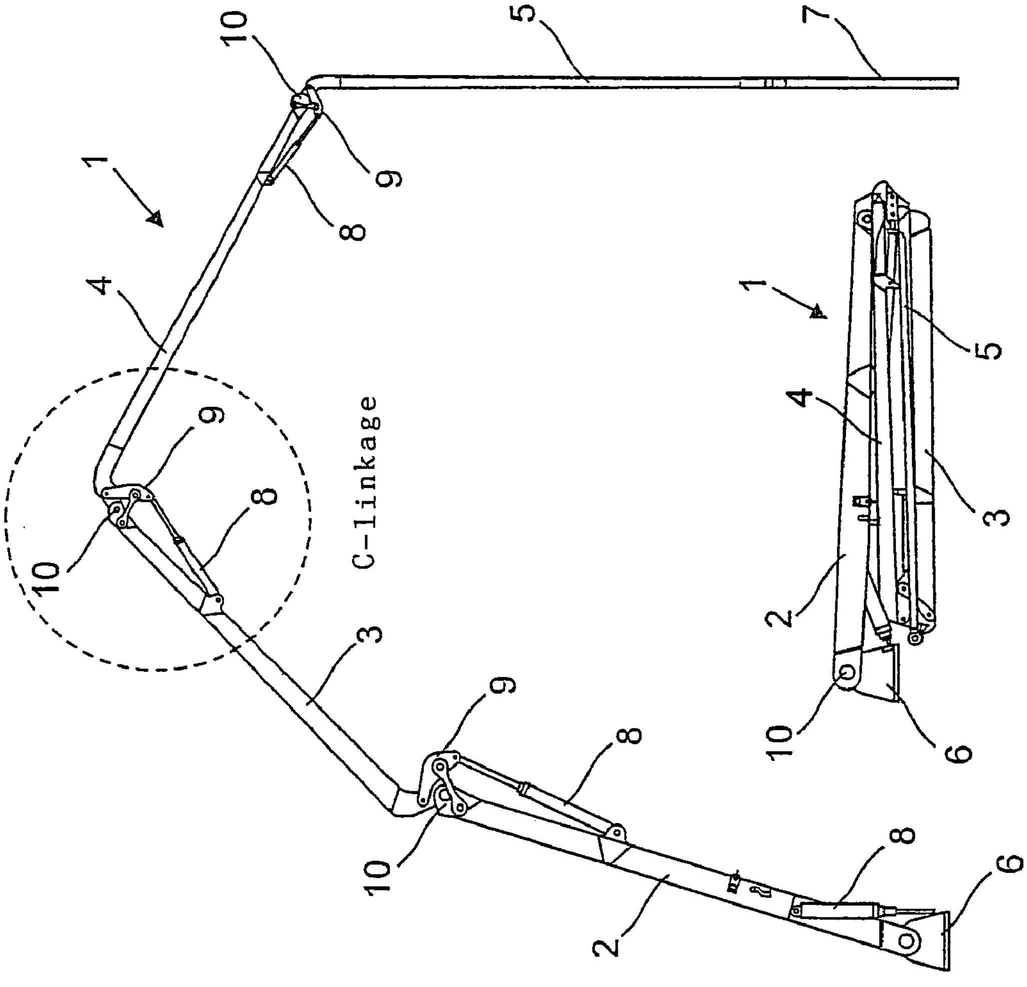

FIG. 1 shows the side elevation of a concrete distribution boom 1 that is made up of four boom segments 2 to 5, which in their turn are mounted on a slewing track ring 6. The slewing track ring 6 is itself rotatably mounted on a frame, especially a vehicle frame in the form of a truck chassis, although this is not shown in the figure.

The individual boom segments 2 to 5 are connected to each other and to the slewing track ring 6 in such a manner as to be able to rotate or swivel, where the axes of rotation 10 extend parallel to each other and in a substantially horizontal direction, that is to say, at right angles to the plane of the figure.

To swivel the boom segments 2 to 5 with respect to each other and the slewing track ring 6 there are provided hydraulic cylinders 8 that, acting via a deflection linkage 9, make it possible to rotate the boom segments 2 to 5 with respect to each other and the slewing track ring 6 when the cylinder 8 is operated.

At the boom tip there is shown the end of a concrete-conveyance conduit in the form of a hosepipe 7. By displacing the slewing track ring 6 and the boom segments 2 to 5, the concrete hose 7 can be placed at any desired point, for example, in some position for pouring a ceiling slab. The displacement of the boom segments 2 to 5 will be effected by means of the hydraulic cylinders 8, which in their turn are activated by an operator via an appropriate distant steering system.

When such a concrete distribution boom 1 is operated, pressure fluctuations in the concrete-conveyance conduit, which may be caused, for example, by a twin cylinder dense-slurry pump, will cause the concrete distribution boom to become subject to cyclical loads having the effect of making the entire boom perform a vibration motion and that, especially at the boom tip, the resulting vibrations will be of substantial amplitude.

With a view to preventing this, the large-size manipulator in accordance with the invention is provided with a control system that collaborates with the distant steering system in such a manner that the vibrations are damped and the deflection of the boom tip is minimized. A schematic diagramme illustrating the functioning of the control system is shown in FIG. 2.

Figure 2:
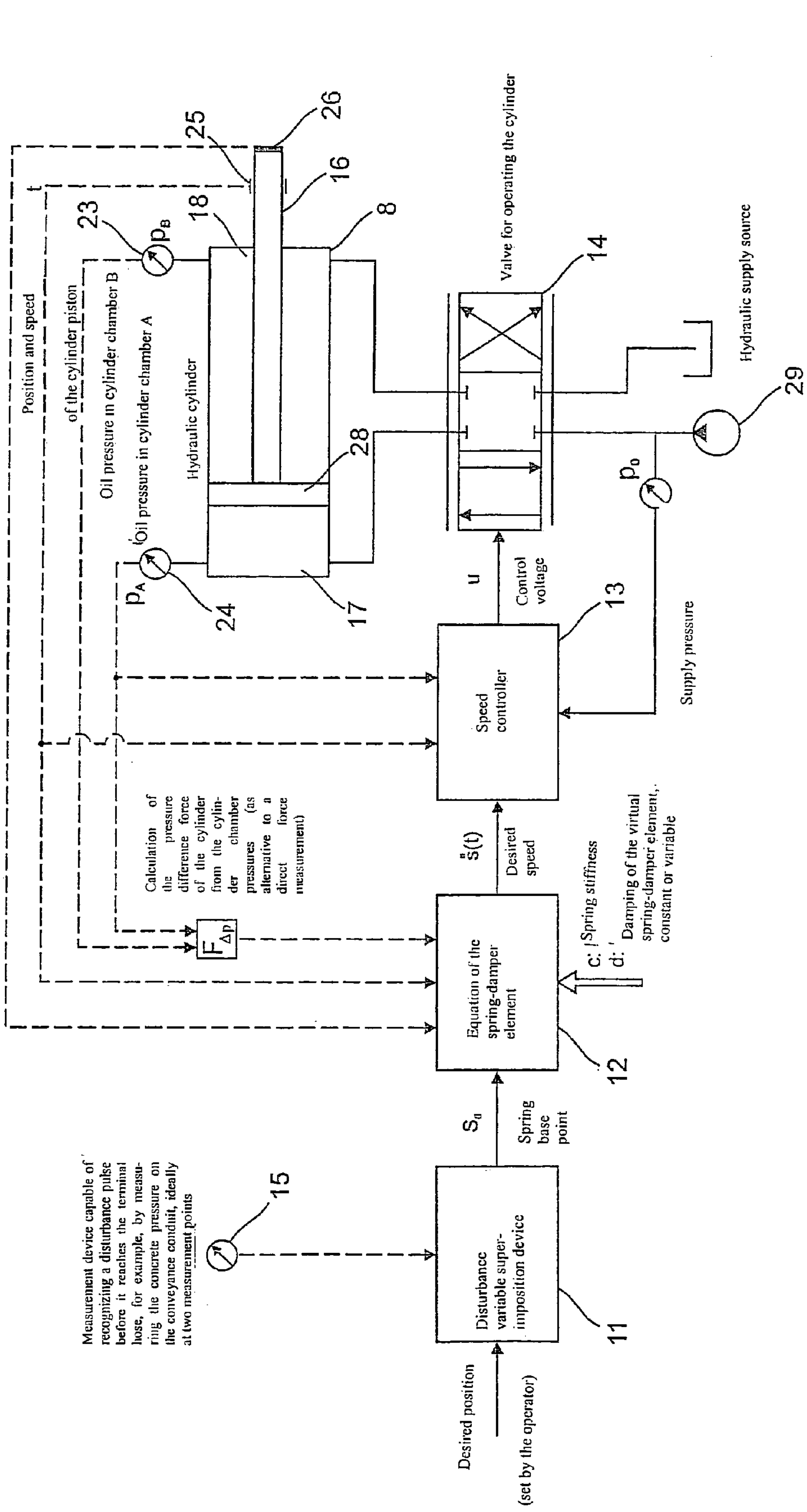
in FIG. 2 a schematic diagramme to illustrate the control of a cylinder used as driving unit to tilt two adjacent boom segments; and in FIG. 3 a schematic representation of the concept for controlling the driving unit to behave in the manner of a virtual spring-damper element.

The control system in accordance with FIG. 2 comprises a disturbance variable superimposition device 11, as well as a damping minimization means 12 and a speed controller 13 that controls the displacement speed of the piston 28 in a hydraulic cylinder 8. To this end various sensors and measuring systems are provided on the large-size manipulator 1 shown in FIG. 1. In the illustrated embodiment only one hydraulic cylinder 8 is controlled by the control system and, more precisely, the one that operates the C-linkage of boom 1 (see FIG. 1). However, it is equally possible to control several or all hydraulic cylinders 8.

On the hydraulic cylinder 8, which generically serves as driving unit for swivelling the boom segments 2 to 5 with respect to each other and with respect to the slewing tack ring 6, there are provided pressure sensors 23 and 24 that measure the pressure in the cylinder chambers 17 and 18 of the hydraulic cylinder 8. A path-measurement system 25 that makes it possible to determine the position and the speed of the cylinder piston 28 is also provided on the piston rod 16. Either in addition or as alternative to the pressure sensors in the cylinder chambers 17 and 18, the piston rod 16 may also be provided with a force sensor 26 with which the force acting on the piston rod 16 can be measured.

In this connection the path-measuring system 25 may either be such as to determine solely the position of the cylinder piston, so that the piston speed has to be determined from the change of the piston position, or alternatively or in addition thereto such as to determine the speed of the piston and/or the piston rod and the direction of the movement, from which information the position of the piston can once again be calculated if its initial position is known.

Furthermore, the control system also comprises a device 15 for measuring the pressure in the concrete-conveyance conduit, which preferably consists of two pressure sensors distributed over the concrete conveyance conduit and capable of determining the pressure differences therein. Since it is intended, above all, to reduce the vibration and the deflection of the boom tip, it will be advantageous if the pressure sensors are provided in a region near the beginning of the concrete-conveyance duct, so that measurement of the pressure at two points of the conveyance conduit may make it possible, for example, to estimate the development of a pressure difference and the manner in which such a pressure wave becomes propagated through the concrete conveyance duct. In this way it becomes possible to make an exact prediction of when a particular pressure load will reach a region of the conveyance duct lying behind of the measurement points and, more particularly, the mast tip.

In the preferred embodiment in accordance with FIG. 2 the hydraulic cylinder is controlled in the following manner: Via the distant steering system, first of all, the control system is provided with a target value that defines the desired position of the hydraulic cylinder 8 and therefore also the position of the boom segment that can be swivelled by means of the hydraulic cylinder 8. The next input is provided by the pressure measurement system 15 that determines pressure fluctuations in the concrete-conveyance conduit, which feeds the expected disturbance condition to the disturbance variable superimposition device 11. Basing itself on the expected disturbance condition, the disturbance variable superimposition device 11 then changes and corrects the target value, i.e. the desired position of the hydraulic cylinder. For example, when it is expected that the boom segment that is to be controlled will have to sustain a greater load and will therefore undergo an elastic deflection from the desired position caused by this greater load, this is counteracted by moving the hydraulic cylinder 8 into a corrected position. To this end the disturbance variable superimposition device provides the corrected position $S_0$, the so-called spring base point.

Figure 3:
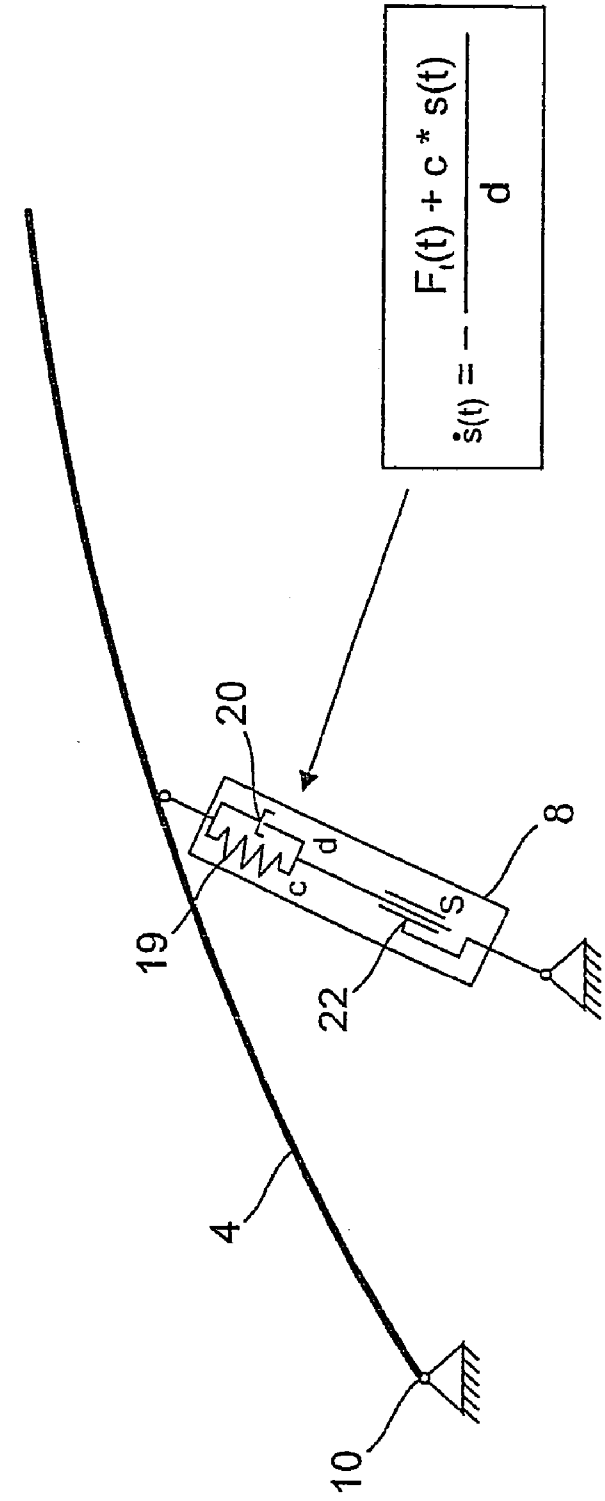

The reason why the corrected position $S_0$ is known as the spring base point is that in the illustrated embodiment the corrected position is used as the input variable for the damping minimization means, which in this case is a virtual spring-damper element that consists of a damper element 19 and a damper element 20, the two elements being connected in parallel (see FIG. 3).

As can be seen better from FIG. 3, the virtual spring-damper element is based on the assumption that vibrations of the boom 1 or the boom segments 2 to 5 can be avoided when the force that acts on the hydraulic cylinder is in equilibrium with the opposite force that is made available by the parallel-connected spring and damper elements 19 and 20. The loading energy is thus absorbed and dissipated by an appropriately designed resilience.

The balance-of-force concept makes it possible to calculate a control variable for the hydraulic cylinder 8 described by means of the virtual spring-damper element. In the shown embodiment this is constituted by the displacement speed ds/dt, which in accordance with the equation reproduced in FIG. 3 can be obtained from the force $F_r(t)$ acting on the cylinder 8, the spring constant c, the damping constant d and the position s(t) of the cylinder. When the displacement speed ds/dt of the cylinder piston 28 is controlled in accordance the equation of FIG. 3, the vibration of the boom segment, in this case boom segments 4 and 5, will be minimized. The data needed for this purpose are partly made available by the measurement devices of the control system, for example, by the force sensor 26 and the path-measurement system 25, which respectively provide the force $F_r(t)$ and the position of the cylinder piston s(t). The spring constant c and the damping constant d may be freely chosen in the virtual system and can therefore be adapted to provide optimal damping.

According to the representation of FIG. 2, the damping minimization means 12 will therefore use the equation of the spring-damper element to calculate a desired displacement speed ds/dt of the cylinder piston 28 from the force $F_r(t)$ that acts on the piston rod 16, the constants c and d for, respectively, the spring stiffness and the damping, which in the given system may either be kept constant or variably adapted. Alternatively, rather than by means of a direct force measurement with the help of the force sensor 26 on the piston rod 28, the load sustained by the cylinder 8 may also be determined from the pressure difference between the cylinder chambers 17 and 18, for which purpose the system will utilize the pressure values determined by the pressure sensors 23 and 24 that are arranged, respectively, in the cylinder chambers 17 and 18.

In the illustrated embodiment the vibration damping by means of the damping minimization means 12 is combined in an advantageous manner with the disturbance variable superimposition device 11, so that the system will provide not only independent damping of the vibrations, but will also compensate the absolute deviation from the desired position. The reason why this is particularly advantageous is that the virtual spring-damper element introduces a certain resilience into the system that could lead to a greater deviation from the desired position. But this opposed by the fact that a corrected position $S_0$ is calculated from the estimated load and made available as input variable for the damping minimization means 12, so that this corrected position is already used as the basis for the calculation of the control variable, namely the desired displacement speed ds/dt of the cylinder piston 28.

The desired displacement speed ds/dt of the cylinder piston 28 determined by the damping minimization means 12 constitutes the control variable for a speed controller 13 that either continuously receives the positions of the cylinder piston 28 via the path-measurement system 25 or directly receives the displacement speed of the cylinder piston 28 together with data about the pressure of the hydraulic supply source 29 and the pressure in the cylinder chamber 17 and 18 of the hydraulic cylinder 8. From these data the speed controller 13 determines a control voltage U that is used to operate the valve 14 and thus to control the hydraulic cylinder 8. The valve 14, which is situated between the hydraulic supply source 19 and the cylinder chambers 17 and 18, governs the introduction of hydraulic oil into the cylinder chambers 17 and 18 or its removal therefrom and thus assures that the desired displacement speed of the piston 28 will be set. Since the hydraulic system is not characterized by linear behaviour over the entire range, the speed controller will be especially a non-linear controller that makes it possible to set the desired displacement speed ds/dt of the cylinder piston 28.

In this particular case the valve 14 may be freely chosen, always provided that in the hydraulic system it has a natural frequency that lies above the natural frequency of the large-size manipulator that is to be controlled and, further, has a hydraulic oil throughput sufficiently rapid to assure operation of the hydraulic cylinder 8.

Apart from such already described components of the control system as the pressure sensors, force sensors, etc., the control system also comprises generally known hardware components that make it possible to convert the measured values and sensor data into digital signals. Moreover, the control system also comprises known hardware components that permit the programming of the described control concept and its transposition and processing.

In the case of the described embodiment it has been found that not all the hydraulic operating cylinders have to be operated in accordance with the control described hereinabove. Rather, it has been found to be sufficient to control one hydraulic cylinder 8 in the previously described manner and, more precisely, the cylinder 8 that operates the penultimate segment 4 of the distribution boom 1 (see FIG. 1, circle drawn as a broken line). Control of the cylinder 8 at this so-called C-linkage is very effective in assuring that vibrations of the boom tip and therefore also of the concrete hose 7 will be strongly damped and have their amplitude minimized, so that an operator who has to handle the concrete hose for its fine positioning will not have to compensate any substantial vibrations and deflections.

The invention claimed is:

1. A large-size manipulator comprising: (i) a boom made up of several segments and arranged on a frame said boom having a slewing track ring, so that by means of a driving unit, the boom is rotated about a substantially vertical axis of rotation, where the boom segments, by means of further driving units, is swivelled with respect to each other and with respect to the slewing track ring about substantially horizontal and mutually parallel axes, (ii) a distant steering system having a steering organ to operate the driving units and to set a desired position of the driving units or the boom segments and the slewing track ring, (iii) a control system having at least one monitoring unit to ascertain a parameter that describes a disturbance condition of at least one boom segment that causes the boom segments to deflect from the position set by the steering organ, or causing them to vibrate, (iv) at least one determination unit determining the load that acts on a driving unit in opposition to the position set by the steering organ wherein, the control system collaborates with the distant steering system to assure that at least one driving unit is controlled in such a manner that an operation of the driving unit minimizes the deviation from the set position of the boom segments and that the vibration of the boom segments caused by the disturbance condition is damped, and (v) wherein a monitoring unit determines a parameter describing a disturbance condition in advance, before the disturbance condition occurs at a position where the effect of the disturbance is compensated by the control system so that the control system imposes a position of the driving unit that counteracts the disturbance and in that the monitoring unit determines the parameter characterizing the disturbance condition by means of sensors on one of said boom segments that is positioned closer to the slewing track ring than the boom segment that is to be corrected.

2. A large-size manipulator in accordance with claim 1, characterized in that the control system comprises a disturbance variable superimposition device that uses the parameter monitored by the monitoring unit an input variable and from it calculates for at least one driving unit a corrected position of said driving unit that differs from the position set by the steering organ and counteracts the disturbance.

3. A large-size manipulator in accordance with claim 1, characterized in that the control system comprises a damping minimization means to damp the vibration of the boom segments that uses the load sustained by the driving unit determined by the determination unit an input variable and an output variable produces a control parameter (ds/dt) for the driving unit.

4. A large-size manipulator in accordance with claim 3, characterized in that the damping minimization means comprises a virtual spring-damper element with spring and damper elements connected in parallel, where the control parameter (ds/dt) for the driving unit is calculated from an equilibrium of force components acting on the driving unit, namely a force Ft(t) and a resultant force component of the spring and damper elements.

5. A large-size manipulator in accordance with claim 3, characterized in that a corrected position (So) of the driving unit determined by the disturbance variable superimposition device on the basis of the parameter determined by the monitoring unit is used as the desired position in the calculation of the control parameter (ds/dt) for the driving unit for the damping by the damping minimization unit.

6. A large-size manipulator in accordance with claim 3, characterized in that the control parameter (ds/dt) that is influenced by the damping minimization means is the displacement speed of the driving unit.

7. A large-size manipulator in accordance with claim 6, characterized in that the control system comprises a speed controller that controls the displacement speed of the driving unit determined by the damping minimization means.

8. A large-size manipulator in accordance with claim 6, characterized in that the control system further comprises at least one sensor, so that the displacement speed of the driving unit is monitored or calculated from the parameter determined by the sensor.

9. A large-size manipulator in accordance with claim 1, characterized in that the driving unit controlled by the control system operates a boom segment positioned closer to the slewing track ring than a boom segment that is to be corrected.

10. A large-size manipulator in accordance with claim 1, characterized in that the control system further comprises at least one position sensor that determines the position of the driving unit.

11. A large-size manipulator in accordance with claim 1, characterized in that the driving units that operate the boom segments are hydraulic or pneumatic cylinders.

12. A large-size manipulator in accordance with claim 11, characterized in that the load sustained by the cylinder in the form of a force acting axially on the cylinder piston is determined either by means of force sensors situated on the piston rod or as a pressure difference by means of pressure sensors provided in the cylinder chamber.

13. A large-size manipulator in accordance with claim 11, characterized in that the cylinder is operated by means of a valve that connects the cylinder to a pressure supply source.

14. A large-size manipulator in accordance with claim 13, characterized in that at least two pressure sensors are provided in a conveyance duct that measure the pressure in the conveyance duct at two points, so that a pressure difference can be determined by the control system.

15. A large-size manipulator in accordance with claim 1, characterized in that the distribution boom comprises a conveyance conduit for the distribution of fluid and, where the disturbance of the set position of the boom segments is produced by discontinuous flow of the material and the parameter that characterizes the disturbance is the pressure in the conveyance conduit, for the measurement of which there is provided at least one pressure sensor.

16. A mobile concrete pump with a vehicle chassis, a concrete pump mounted on the vehicle chassis and a distribution boom that is designed as a large-size manipulator in accordance with claim 1.

17. A method of operating a large-size manipulator in accordance with claim 1, characterized in that an operator, utilizing the distant steering system, sets the desired position of the boom segments and the slewing track ring, where any deviation from the desired position caused by a disturbance is automatically compensated and, any vibrations of the boom tip are damped.

18. A method in accordance with claim 17, characterized in that the operator, independently of regularly recurring disturbances, may change the desired position by means of the distant steering system and where, notwithstanding the change in the desired position, even the deviations therefrom caused by the disturbance is automatically compensated.

19. A method in accordance with claim 18, characterized in that the regular recurring disturbances are pressure fluctuations in a conveyance conduit of the concrete distribution boom.

* * * * *